United States Patent [19]
Lamphron et al.

[11] Patent Number: 5,943,521
[45] Date of Patent: Aug. 24, 1999

[54] CAMERA WITH MOVABLE PROTECTIVE COVER SUPPORTED FOR PIVOTING TO ACTIVATE SWITCH

[75] Inventors: Mark A. Lamphron, Rochester; Michael L. DeCecca, Fairport, both of N.Y.

[73] Assignee: Eastman Kodak Company, Rochester, N.Y.

[21] Appl. No.: 09/037,813

[22] Filed: Mar. 10, 1998

[51] Int. Cl.$^6$ .................................................. G03B 17/00
[52] U.S. Cl. .......................................... 396/448; 396/543
[58] Field of Search ............................. 396/6, 176, 177, 396/178, 205, 348, 448, 543

[56] References Cited

U.S. PATENT DOCUMENTS

| | | |
|---|---|---|
| 4,189,222 | 2/1980 | Maitani . |
| 4,441,799 | 4/1984 | Enomoto . |
| 4,500,184 | 2/1985 | Morizumi et al. . |
| 4,557,574 | 12/1985 | Kohno et al. . |
| 5,565,943 | 10/1996 | Muramatsu et al. . |
| 5,574,337 | 11/1996 | Dunsmore . |

*Primary Examiner*—Howard B. Blankenship
*Attorney, Agent, or Firm*—Roger A. Fields

[57] ABSTRACT

A camera comprising a particular device (such as an electronic flash unit) that requires electrical energy to operate, a power switch capable of being changed from a normal state to a working state in order to provide electrical power to the device and biased to return to the normal state, and a protective cover (such as a lens cover) that changes the power switch from the normal state to the working state as the protective cover is moved from being closed to being open, is characterized in that the protective cover is supported for manual movement when open, without being moved to close, to change the power switch from the normal state to the working state when the power switch has returned to the normal state.

11 Claims, 5 Drawing Sheets

5,943,521

CAMERA WITH MOVABLE PROTECTIVE COVER SUPPORTED FOR PIVOTING TO ACTIVATE SWITCH

FIELD OF THE INVENTION

The invention relates generally to the field of photography, and in particular to cameras. More specifically, the invention relates to a camera in which operation of a power switch or the like is associated with opening movement of a protective cover.

BACKGROUND OF THE INVENTION

It is well known for a camera to include an electronic flash unit, a flash activation switch capable of being changed from a non-activation state to an activation state and biased to return to the non-activation state, and a lens cover that changes the flash activation switch from the non-activation state to the activation state as the lens cover is moved from being closed to being open.

Problem

If the lens cover is left open for a relatively long time and the flash activation switch is maintained in the activation state, the battery for providing electrical energy to the flash capacitor may become prematurely drained. Alternatively, if the flash activation switch is allowed to return to the non-activation state when the lens cover is open, the lens cover must be closed and re-opened in order to return the flash activation switch to the activation state.

SUMMARY OF THE INVENTION

A camera comprising a particular device (such as an electronic flash unit) that requires electrical energy to operate, a power switch capable of being changed from a normal state to a working state in order to provide electrical power to the device and biased to return to the normal state, and a protective cover (such as a lens cover) that changes the power switch from the normal state to the working state as the protective cover is moved from being closed to being open, is characterized in that:

the protective cover is supported for manual movement when open, without being moved to close, to change the power switch from the normal state to the working state when the power switch has returned to the normal state.

DETAILED DESCRIPTION OF THE INVENTION

The invention is disclosed as being embodied preferably in a flash camera. Because the features of a flash camera are generally known, the description which follows is directed in particular only to those elements forming part of or cooperating directly with the disclosed embodiment. It is to be understood, however, that other elements may take various forms known to a person of ordinary skill in the art.

Figure 1:
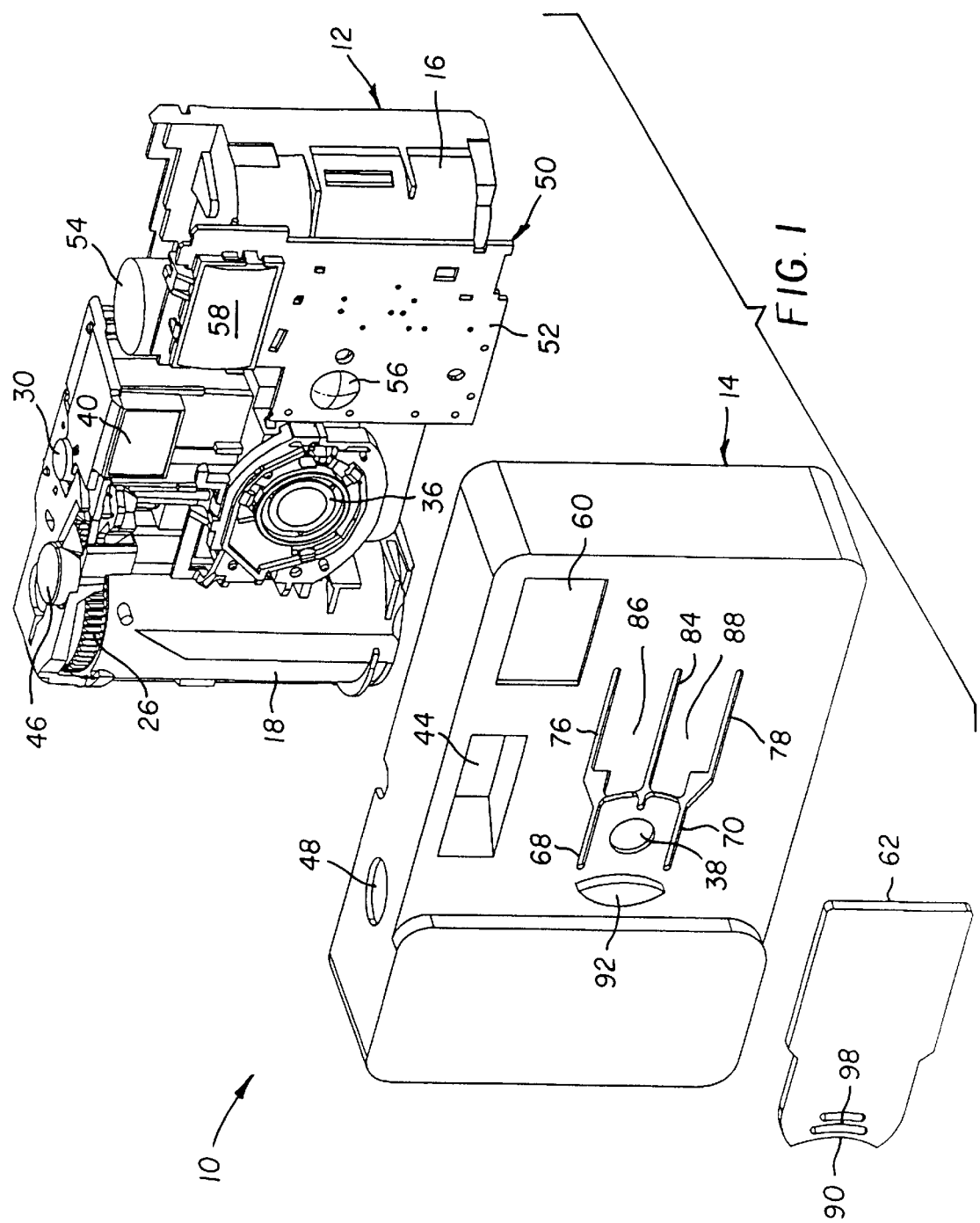
FIG. 1 is an exploded front perspective view of a camera according to a preferred embodiment of the invention.
Figure 2:
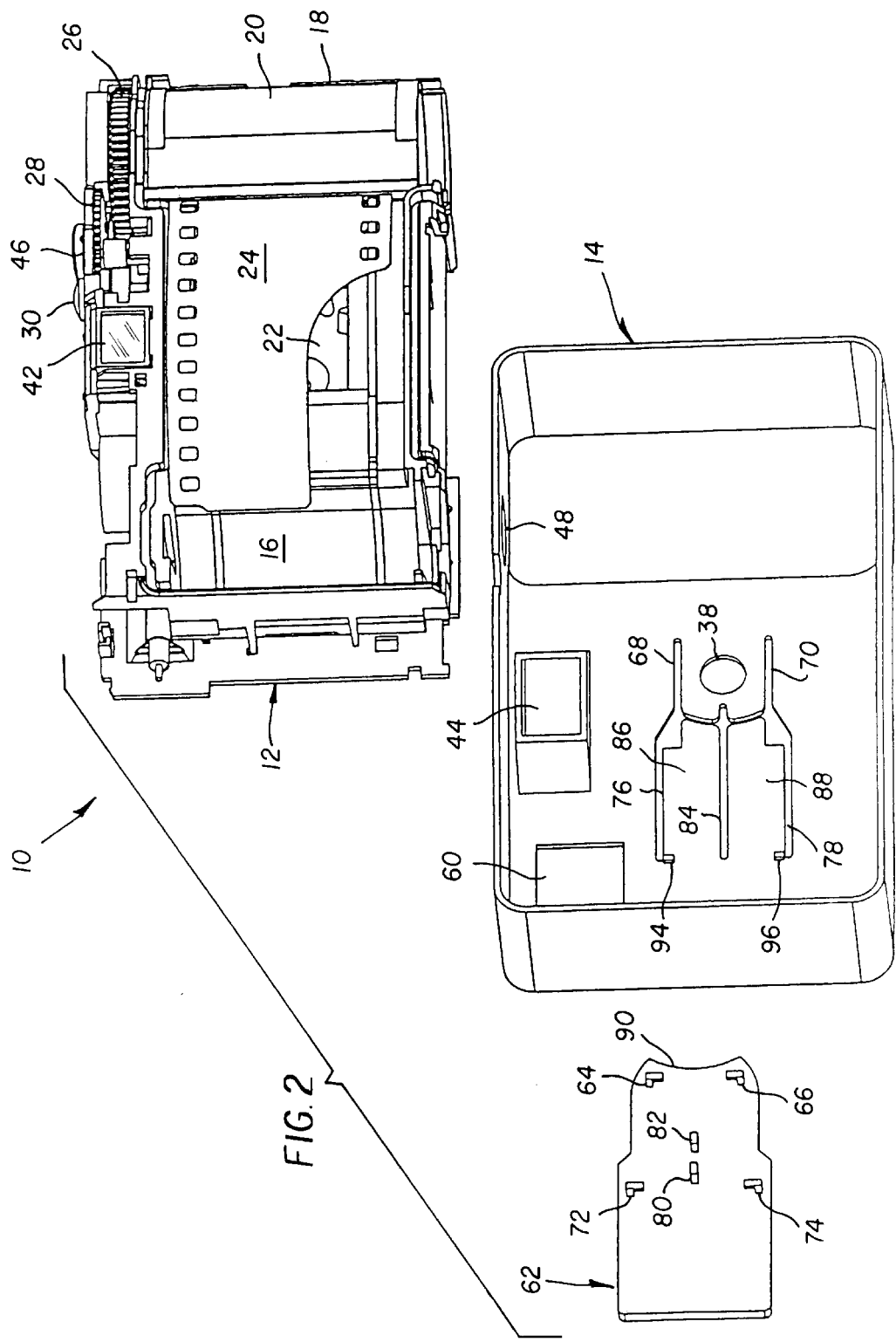
FIG. 2 is an exploded rear perspective view of the camera.

Referring now to the drawings, FIGS. 1 and 2 show a one-time-use camera 10 comprising a main body part 12 that is encased in a front housing part 14 and a rear housing part (not shown).

Figure 5:
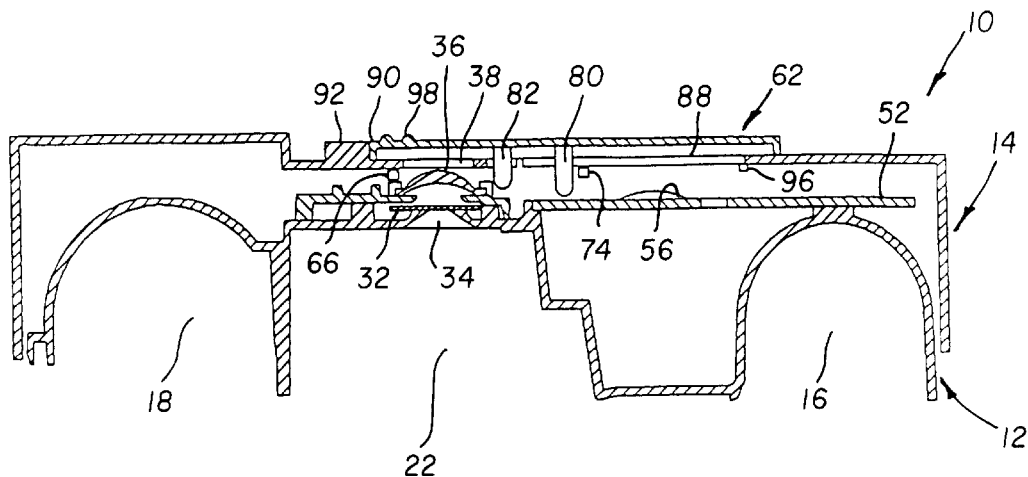
FIG. 5 is a sectional view of the camera with the protective lens cover fully closed as in FIG. 3.

As shown in FIGS. 1, 2 and 5, the main body part 12 has an unexposed film supply chamber 16 for an unexposed film roll (not shown), a cartridge receiving chamber 18 for a standard 35mm film cartridge 20, and a backframe opening 22 located between the two chambers. Each time a picture is taken, one of the successive sections of a filmstrip 24 is first exposed and then wound into the film cartridge 20. A film wind thumbwheel 26 is rotatably supported on the main body part 12 in coaxial engagement with the protruding end of a film spool (not shown) inside the film cartridge 20 to manually rotate the film spool in a film winding direction. An exposure counter wheel 28 is rotatably supported on the main body part 12, beneath a magnifier lens 30. A single-blade shutter 32 is normally positioned between an exposure opening 34 in the main body part 12 and a taking lens 36. The taking lens 36 is located at a lens opening 38 in the front housing part 14. A pair of front and rear viewfinder lenses 40 and 42 are supported on the main body part 12 for viewing a subject to be photographed. The front viewfinder lens 40 is located at a lens opening 44 in the front housing part 14. A shutter release button 46 is supported on the main body part 12 to be manually depressed in order to initiate picture-taking. The shutter release button 46 is located at a top opening 48 in the front housing part 14.

Figure 6:
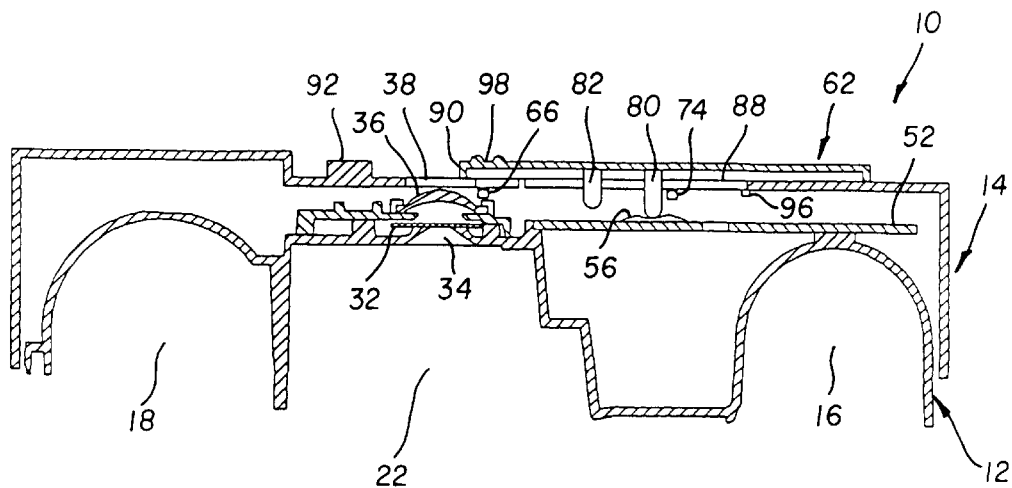
FIG. 6 is a sectional view of the camera with the protective lens cover partially open and a first switch actuation member on the underside of the cover closing a normally open flash activation switch.
Figure 8:
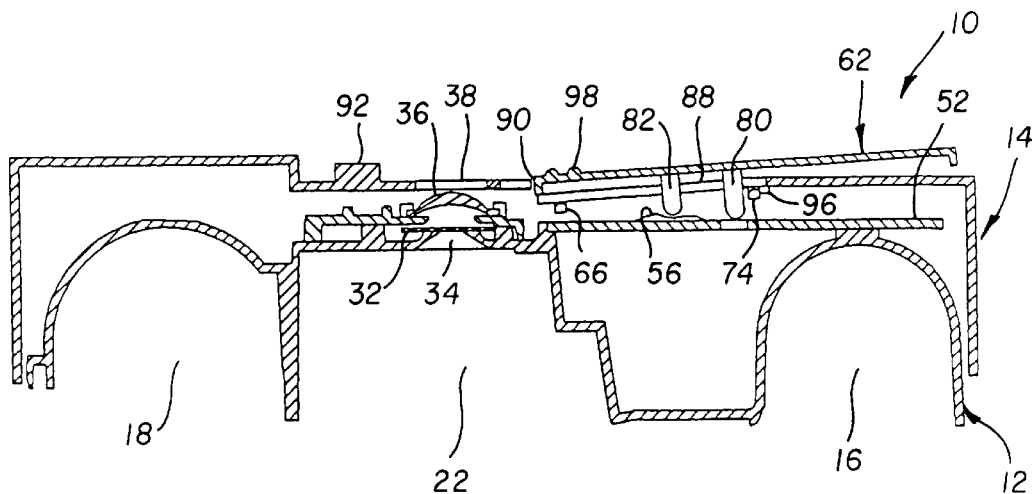
FIG. 8 is a sectional view of the camera with the protective lens cover fully open and the second switch actuation member re-closing the flash activation switch.

A known electronic flash unit 50 comprises a flash circuit board 52 on which is mounted a flash capacitor 54, a resilient dome flash activation switch 56, and a flash emission lens 58 for a flash tube and reflector(not shown). See FIG. 1. The flash emission lens 58 is located at a flash opening 60 in the front housing part 14. The flash activation switch 56 is capable of being collapsed, as shown in FIGS. 6 and 8, to be changed from a normal non-activation or open state to a working activation or closed state in order to provide electrical power from a battery (not shown) to the flash capacitor 54, and it is inherently biased to return to the non-activation state. If a picture is taken shortly after the switch 56 returns to its non-activation state, the flash capacitor 54 will be automatically recharged via a suitable single-touch flash charger circuit disclosed in incorporated U.S. Pat. No. 5,574,337 issued Nov. 12, 1996. Otherwise, the flash capacitor 54 will eventually lose its charge; which then requires that the switch 56 again be collapsed to be changed to its working activation or closed state.

As shown in FIG. 2, a protective lens cover 62 for the taking lens 36 has an integral first set of parallel guide protuberances 64 and 66 that are located in respective track openings 68 and 70 in the front housing part 14, an integral second set of parallel guide protuberances 72 and 74 that are located in respective track openings 76 and 78 in the front housing part, and an integral pair of relatively long and short in-line first and second switch actuation protuberances 80 and 82 that are located one behind the other in a single track opening 84 in the front housing part. A pair of parallel resilient cantilever beams 86 and 88 are located on the front housing part 14 between the track openings 76 and 84 and the track openings 78 and 84.

Figure 3:
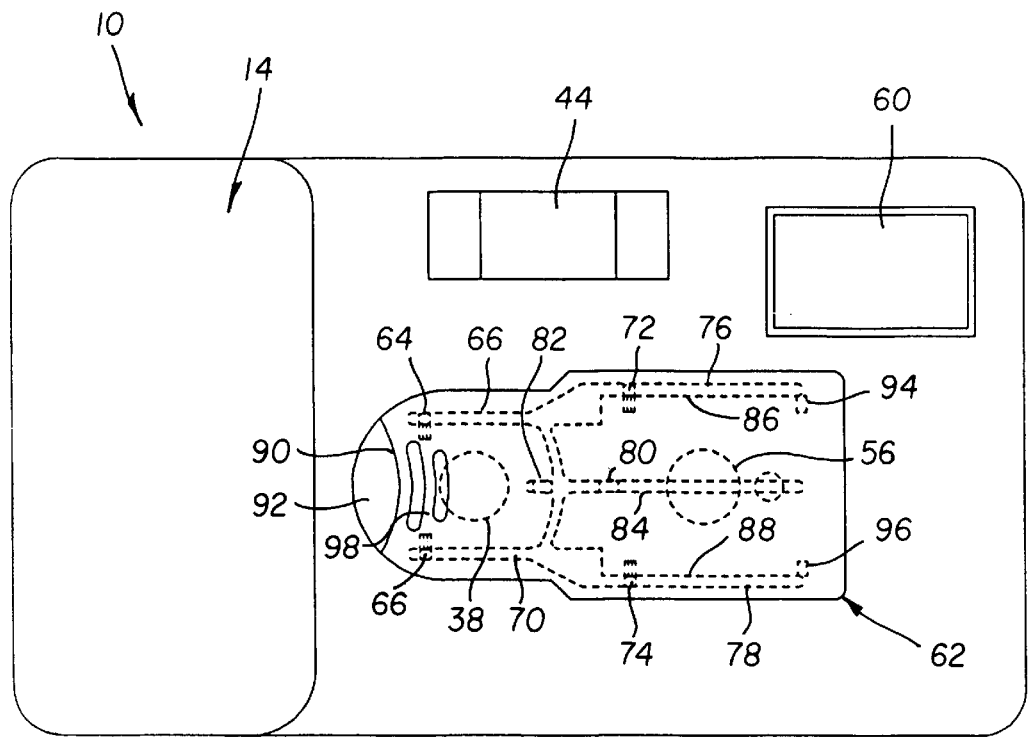
FIGS. 3 and 4 are front elevation views of the camera, showing a protective lens cover fully closed and fully open.
Figure 4:
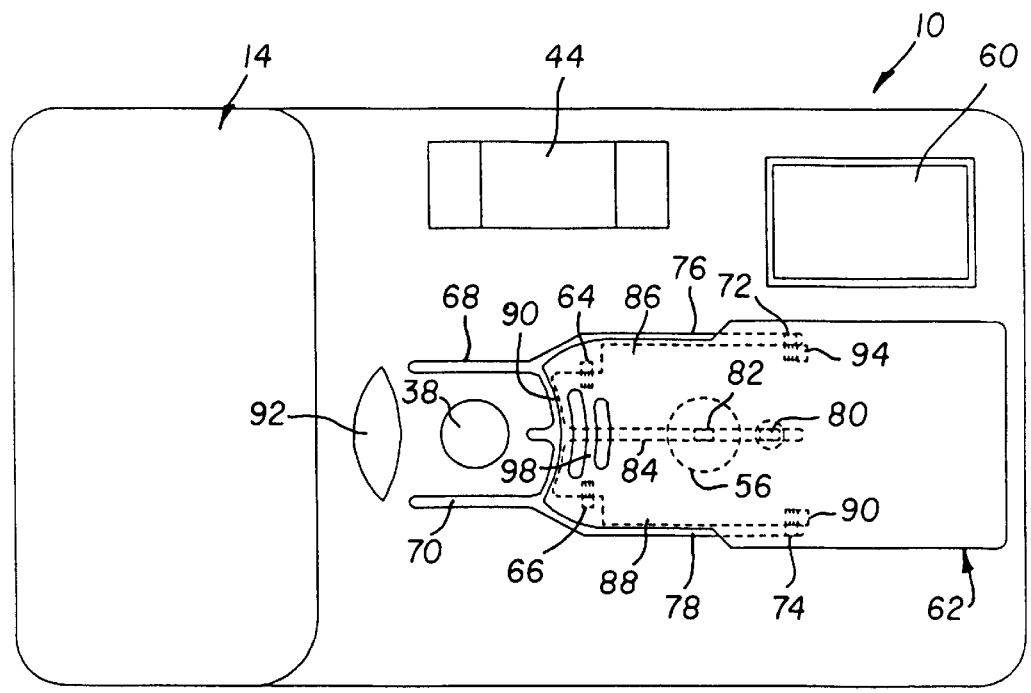
Figure 7:
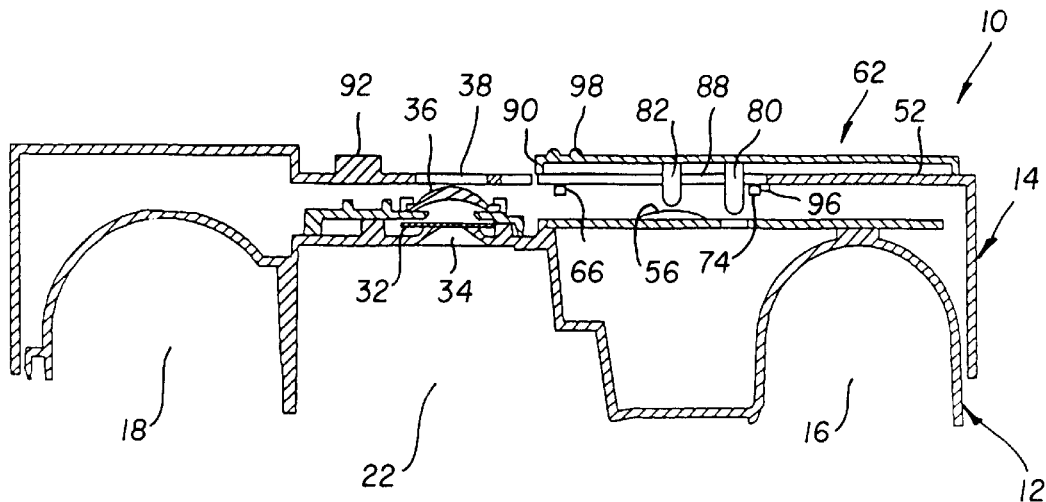
FIG. 7 is a sectional view of the camera with the protective lens cover fully open as in FIG. 4 and a second switch actuation member on the underside of the cover opposite the re-opened flash activation switch.

The lens cover 62 can be manually translated along the front housing part 14 from a fully closed position over the lens opening 38, to a partially closed/partially opened position in which the lens cover partially uncovers the lens opening, and thence to a fully opened position in which the lens opening is completely uncovered. The fully closed position of the lens cover 62 is shown in FIGS. 3 and 5. In this position, an end-edge 90 of the lens cover 62 is against a single fixed stop 92 on the front housing part 14. The partially closed/partially opened position of the lens cover 62 is shown in FIG. 6. The fully opened position of the lens cover 62 is shown in FIGS. 4 and 7. In this position, the second set of parallel guide protuberances 72 and 74 are against respective fixed stops 94 and 96 on the front housing part 14.

When the lens cover 62 is in the partially/closed/partially opened position shown in FIG. 6, the first switch actuation protuberance 80 abuts the flash activation switch 56 to collapse the switch. Thus, the switch 56 is changed from its normal non-activation or open state to its working activation or closed state in order to provide electrical power from the battery (not shown) to the flash capacitor 54.

When the lens cover 62 is in its fully open position shown in FIGS. 4 and 7, the flash activation switch 56 has returned to its normal non-activation or open state and the second switch actuation protuberance 82 is opposite the switch.

If the lens cover 62 is left in its fully opened position for some time without taking a picture, the flash activation switch 56 must be collapsed to be changed from its normal non-activation or open state to its working activation or closed state in order to provide electrical power from the battery (not shown) to the flash capacitor 54. This is accomplished, as shown in FIG. 8, by manually depressing the lens cover 62 at a finger grip 98 on the lens cover, which presses the lens cover against the cantilever beams 86 and 88 to pivot the beams and thus the lens cover, to make the second switch actuation protuberance 82 abut the switch 56.

The invention has been described with reference to a preferred embodiment. However, it will be appreciated that variations and modifications can be effected by a person of ordinary skill in the art without departing from the scope of the invention.

PARTS LIST 10. one-time-use camera
12. main body part
14. front housing part
16. unexposed film supply chamber
18. cartridge receiving chamber
20. film cartridge
22. backframe opening
24. filmstrip
26. film wind thumbwheel
28. exposure counter wheel
30. magnifier lens
32. shutter
34. exposure opening
36. taking lens
38. lens opening
40. front viewfinder lens
42. rear viewfinder lens
44. lens opening
46. shutter release button
48. top opening
50. electronic flash unit
52. flash circuit board
54. flash capacitor
56. flash activation switch
58. flash emission lens
60. flash opening
62. protective lens cover
64. first guide protuberance
66. first guide protuberance
68. track opening
70. track opening
72. second guide protuberance
74. second guide protuberance
76. track opening
78. track opening
80. first switch actuation protuberance
82. second switch actuation protuberance
84. track opening
86. cantilever beam
88. cantilever beam
90. end-edge
92. stop
94. stop
96. stop
98. finger grip

What is claimed is:

1. A camera comprising a particular device that requires electrical energy to operate, a power switch capable of being changed from a normal state to a working state in order to provide electrical power to said device and biased to return to the normal state, and a protective cover that changes said power switch from the normal state to the working state as said protective cover is moved from being closed to being open, is characterized in that:

said protective cover is supported for manual movement when open, without being moved to close, to change said power switch from the normal state to the working state when the power switch has returned to the normal state.

2. A camera as recited in claim 1, wherein said protective cover continuously covers said power switch.

3. A camera as recited in claim 1, wherein said protective cover has a first switch actuation member that momentarily abuts said power switch to change the power switch from the normal state to the working state as the protective cover is moved from being closed to being open and a second switch actuation member that is positioned opposite the power switch when the protective cover is open, and said protective cover is supported to be manually moved when said second switch actuation member is positioned opposite said power switch to make the second switch actuation member abut the power switch to change the power switch from the normal state to the working state.

4. A camera as recited in claim 3, wherein a stop prevents said protective cover from being opened further when said second switch actuation member is positioned opposite said power switch.

5. A camera as recited in claim 3, wherein said protective cover is supported for translation to move from being closed to being opened and is capable of being manually depressed to make said second switch actuation member abut said power source switch.

6. A camera as recited in claim 5, wherein a resilient cantilever beam supports said protective cover to permit the protective cover to be pivoted when it is manually depressed.

7. A camera as recited in claim 6, wherein a front housing part supports said protective cover for translation, and said cantilever beam is integrally formed with said front housing part.

8. A camera as recited in claim 6, wherein said first and second switch actuation members are respective protuberances that project relatively greater and lesser distances from said protective cover.

9. A camera comprising an electronic flash unit that must be activated to be used, and a protective cover that activates said electronic flash unit as said protective cover is moved from being closed to being open, is characterized in that:

said protective cover is supported for manual movement when open, without being moved to close, to re-activate said electronic flash unit when the electronic flash unit has become deactivated.

10. A camera comprising an electronic flash unit, a flash activation switch capable of being changed from a non-activation state to an activation state and biased to return to the non-activation state, and a lens cover that changes said flash activation switch from the non-activation state to the activation state as said lens cover is moved from being closed to being open, is characterized in that:

said lens cover is supported for manual movement when open, without being moved to close, to change said flash activation switch from the non-activation state to the activation state when the flash activation switch has returned to the non-activation state.

11. A camera comprising an electronic flash unit, a flash activation switch capable of being changed from a non-activation state to an activation state and biased to return to the non-activation state, and a lens cover that changes said flash activation switch from the non-activation state to the activation state as said lens cover is moved from being closed to being open, is characterized in that:

said lens cover has a first switch actuation member that momentarily abuts said flash activation switch to change the flash activation switch from the non-activation state to the activation state as the lens cover is moved from being closed to being open and a second switch actuation member that is positioned opposite the flash activation switch when the lens cover is open, and said lens cover is supported to be manually moved when said second switch actuation member is positioned opposite said flash activation switch to make the second switch actuation member abut the flash activation switch to change the flash activation switch from the non-activation state to the activation state.

* * * * *